US006992959B1

(12) United States Patent
Tosaki et al.

(10) Patent No.: US 6,992,959 B1
(45) Date of Patent: Jan. 31, 2006

(54) OPTICAL DISK, METHOD OF REPRODUCING AND COPYING OPTICAL DISK, AND METHOD OF PREVENTING ILLEGAL USE OF OPTICAL DISK

(75) Inventors: Yoshihiro Tosaki, Ibaraki (JP); Tsutomu Kai, Katano (JP); Shinji Inoue, Onsen-gun (JP); Hiromichi Shimada, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/582,727

(22) PCT Filed: Nov. 2, 1999

(86) PCT No.: PCT/JP99/06102

§ 371 (c)(1),
(2), (4) Date: Sep. 7, 2000

(87) PCT Pub. No.: WO00/26912

PCT Pub. Date: May 11, 2000

(30) Foreign Application Priority Data

Nov. 2, 1998 (JP) .................................. 10-312222

(51) Int. Cl.
*G11B 7/00* (2006.01)

(52) U.S. Cl. .................................................. 369/53.21

(58) Field of Classification Search ............. 369/47.12, 369/47.21, 47.22, 53.2, 53.21, 53.23, 55.24, 369/55.25, 84, 275.2, 275.3, 275.4; 360/60

See application file for complete search history.

(56) References Cited

U.S. PATENT DOCUMENTS

| 5,538,773 | A | | 7/1996 | Kondo |
| 5,541,905 | A | | 7/1996 | Aramaki |
| 5,694,381 | A | | 12/1997 | Sako |
| 5,802,174 | A | | 9/1998 | Sako et al. |
| 5,832,088 | A | * | 11/1998 | Nakajima et al. .............. 380/22 |
| 5,907,656 | A | | 5/1999 | Oguro |
| 6,005,839 | A | | 12/1999 | Sako et al. |
| 6,009,170 | A | | 12/1999 | Sako et al. |
| 6,034,832 | A | * | 3/2000 | Ichimura et al. .............. 360/60 |
| 6,289,102 | B1 | | 9/2001 | Ueda et al. |
| 6,539,468 | B1 | * | 3/2003 | Inoue et al. ................. 380/201 |

FOREIGN PATENT DOCUMENTS

| CN | 417084 | 1/2001 |
| EP | 0723216 | 7/1996 |
| EP | 0863506 A2 | 9/1998 |
| EP | 0969463 | 1/2000 |
| JP | 4-123320 | 4/1992 |
| JP | 05210849 | 8/1993 |
| JP | 7-21687 | 1/1995 |

(Continued)

*Primary Examiner*—William Korzuch
*Assistant Examiner*—Joseph Haley
(74) *Attorney, Agent, or Firm*—Wenderoth, Lind & Ponack, L.L.P.

(57) ABSTRACT

In a DVD player, when data information in a DVD disk is played back, it is judged whether the data information is protected by a copyright or not on the basis of disk control information. Further, it is judged whether the DVD disk is writable or not, based on whether the DVD disk is provided with a wobble or not. Thus, if the data information is protected by the copyright and the DVD disk is writable, a playback of the DVD disk is prevented so that an illegal use of the DVD disk, which infringes the copyright, is effectively prevented.

49 Claims, 9 Drawing Sheets

FOREIGN PATENT DOCUMENTS

| | | |
|---|---|---|
| JP | 7-182766 | 7/1995 |
| JP | 07-274115 | 10/1995 |
| JP | 9-17119 | 1/1997 |
| JP | 9-55731 | 2/1997 |
| JP | 09055025 | 2/1997 |
| JP | 9-115242 | 5/1997 |
| JP | 9-171619 | 6/1997 |
| JP | 9-320192 | 12/1997 |
| JP | 10-188285 | 7/1998 |
| JP | 10-247362 | 9/1998 |
| WO | 97/14147 | 4/1997 |
| WO | 9733283 | 9/1997 |

\* cited by examiner

OPTICAL DISK, METHOD OF REPRODUCING AND COPYING OPTICAL DISK, AND METHOD OF PREVENTING ILLEGAL USE OF OPTICAL DISK

TECHNICAL FIELD

The present invention relates to an optical disk, an apparatus for playing back and apparatus for copying the optical disk, and a method of preventing an illegal use of the optical disk, and in particular, relates to a circular optical disk (recording medium) in which record signals such as images or voices are ciphered and recorded in order to protect their copyrights against illegal copying thereof, and to an apparatus for playing back or copying the optical disk.

BACKGROUND ART

In general, in a DVD disk on the market, in which a movie, music or the like is collected (recorded), data information such as images, voices or the like is ciphered and recorded in order to protect its copyright against an illegal use thereof. Thus, when the DVD disk is played back using a DVD player, the DVD player plays back it by reading key information recorded in a subaltern information region of the same DVD disk, and deciphering the ciphered data information using the key information to reconstruct the original images, voices or the like.

Hereinafter, a conventional DVD disk and a disk player of the above-mentioned type will be described. FIG. 12 is a perspective view showing a rough construction of the above-mentioned conventional DVD disk. In FIG. 12, 101 denotes the DVD disk. 102 denotes a main information region of the DVD disk 101. Data information such as images, voices or the like is generally ciphered and recorded in the main information region 102. 103 denotes a key information region which records key information for deciphering the data information recorded in the main information region 102. The key information region 103 is located at an inner periphery side in the DVD disk 101.

FIG. 11 is a block diagram showing a rough construction of the conventional DVD player. In FIG. 11, 101 denotes the DVD disk shown in FIG. 12, which also records the data information such as images or voices to be played back. 104 denotes an optical pickup which reads record signals of the DVD disk 101 using a laser ray. 105 denotes a transfer controller which moves the optical pickup 104 in the radial direction of the DVD disk 101 in order to read the record signals at arbitrary positions on the DVD disk 101. 106 denotes a disk motor which rotates the DVD disk 101. 107 denotes a first control circuit control circuit 109 digitizes (makes binary) the input which controls the optical pickup 104, the transfer controller 105 and the disk motor 106. 108 denotes an amplifier which amplifies the signals which have been read by the optical pickup 104. 109 denotes a second control circuit into which the output signals of the amplifier 108 are inputted. Based on the signals, the second control circuit 109 generates servo signals, such as focus error signals or tracking error signals, which are required when the optical pickup 104 reads the DVD disk 101, and then outputs them to the first control circuit 107. Further, the second signals of analog type. 110 denotes a demodulation circuit which analyzes the signals which have been read from the DVD disk 101 and digitized, and reconstructs the data information such as the original images or music. 111 denotes a system control circuit which controls the whole DVD player.

Hereinafter, actions of the DVD player having the above-mentioned construction will be described. When the DVD disk on the market is played back, at first, the transfer controller 105 is driven by the first control circuit 107 in accordance with the instruction of the system control circuit 111 so as to move the optical pickup 104 to an inner periphery side in the DVD disk 101. The signals, which have been read by the optical pickup 104, are amplified by the amplifier 108, and further digitized by the second control circuit 109. Then, the contents of the signals are read by the demodulation circuit 110. The modulation circuit 110 sends the results to the system control circuit 111. Then, the system control circuit 111 outputs another instruction to the first control circuit 107 again, if the read contents do not include the key information of the key information recording region 103 (see FIG. 12). Thus, the transfer controller 105 is driven by the first control circuit 107 so as to move the optical pickup 104 to a more inner position of the DVD disk 101, and then the key information is searched.

The key information recorded in the inner portion of the DVD disk 101 is found by repeating the abovementioned actions so that the information is read by the demodulation circuit 110. If the system control circuit 111 detects that the modulation circuit 110 has read the key information of the DVD disk 101, the transfer controller 105 is driven by the first control circuit 107 in accordance with the instruction of the system control circuit 111 so as to move the optical pickup 104 to an outer periphery side. Then, the optical pickup 104 reads the record signals in the main information region 102 of the DVD disk 101 (see FIG. 12). Because the record signals are generally ciphered, normal image signals or voice signals cannot be obtained if the record signals are played back as they stand. However, the record signals can be deciphered if the key information, which is recorded in the key information recording region 103 and has been read, is used. Thus, the demodulation circuit 110 deciphers the record signals of the main information region 102 using the key information which has been read so as to reconstruct the original and normal image data or voice data.

However, in the writable optical disk such as a DVD-R or the like, a copy of the optical disk may be easily produced by copying the subaltern information region, too. As a physical means for preventing it, there has been proposed such a method to form other information previously by means of pre-pits in the key information region.

The above-mentioned pre-pits will be described with reference to FIG. 9. FIG. 9 shows a section which is made by cutting a DVD disk 1 on the market along its radial direction, and the recording condition of the information therein. In FIG. 9, the left side is the inner periphery side of the disk, while the right side is the outer periphery side of the disk. Hereupon, 32 denotes a main information region (main recording region), while 33 denotes a key information recording region. Further, 43 denotes first key information, which is recorded in the key information recording region 33. 44 denotes a main data, which is recorded in the main information region 32. Although the main data 44 such as an image data or a music data is ciphered, it can be deciphered by using the first key information 43.

45 denotes a writable DVD disk (DVD-R disk). In the main information region 32 of the disk, signals can be freely recorded. 46 denotes other key information (second key information) which has been previously formed by means of pre-pits instead of the normal key information. The other key information has been previously recorded in the key information recording region 33 of the writable DVD disk 45 in such a manner that it cannot be rewritten. The second key information 46 is a data which is not available for the use of deciphering the cipher. That is, the second key information cannot decipher the cipher of any of the main data 44. Meanwhile, the contents in the main data 44 recorded in the main information region 32 of the writable DVD disk 45 are quite as same as those in the main data 44 of the original DVD disk 1.

However, even if someone intends to play back the writable DVD disk 45 using the above-mentioned DVD player, the second key information 46 recorded in the key information recording region 33 disposed at a predetermined position in the inner periphery portion of the writable DVD disk is the unavailable data which is different from the original data for deciphering the cipher, as described above. Therefore, even if the unavailable key information is used, the ciphered data cannot be reconstructed to the original and normal image signals or voice signals. As a consequence, it is designed that the illegally copied writable DVD disk cannot be played back.

Although the illegal copy can be prevented in the ordinary apparatus as described above, it is probable that the key information as well as the data information is also copied into the main information region by using a remodeled drive or the like. Hereinafter, there will be described such a case that not only the main data but also the key information is copied and recorded in the main information region of the writable DVD disk.

FIG. 10 is a view showing a read only DVD disk on the market, which is the original of copying and has normal key information only. Hereupon, FIG. 10 shows such a state that the key information and the contents of the writable DVD disk on the market, in which a movie, music or the like is collected, are copied to the main information region.

As shown in FIG. 10, both of the main data 44 and the first key information 43 of the original DVD disk 1 are copied and recorded in the main information region 32 of the writable DVD disk 45. Although the second key information 46, which is the original key information, has been previously recorded in the key information recording region 33 of the writable DVD disk 45, the second key information 46 is the unavailable data for deciphering the data of the main information region 32, as described above. In this case, it is impossible to decipher the main data 44 using the second key information 46 located at the predetermined position. However, it is possible to decipher the cipher, if the first key information. 43 recorded in the main information region 32, which is not located at the predetermined position, is used.

Hereinafter, there will be described such a case that a writable DVD disk is played back using a DVD player with reference to FIG. 3 for the later-mentioned Embodiment 3 or 4 of the present invention for convenience's sake. In FIG. 3, at first, a transfer controller 4 is driven by first control means 6 in accordance with second control means 9 so as to move an optical pickup 3 to the second subaltern information region located at the most inner periphery side of a DVD disk 1. The optical pickup 3 reads disk information signals such as the disk type information and positional information of the first subaltern information region, which are stored in the second subaltern information region. The signals are amplified by an amplifier 5. Further, the contents of the signals are detected by demodulation means 7, and then judged by disk judging means 14. In accordance with the read positional information of the first subaltern information region, the second control means and the first control means 6 drive the transfer controller 4 and make the transfer controller 4 move the optical pickup 3. Thus, the disk control information, which includes the key data of the first subaltern information region located at the normal position, is read.

However, in the conventional playback system or copy system for the DVD disk, if each of the ciphered data information such as a movie or music and the key information for deciphering the data information in the DVD disk on the market is copied to the DVD-R or RW disk, each of which is a user-writable DVD disk, it is probable that the ciphered data information may be deciphered to be played back on the basis of the key information which has been copied to the writable DVD disk. In consequence, in the conventional system, there exists such a problem that illegal uses of the DVD disk or other optical disks, which infringe the copyrights, cannot be effectively prevented.

SUMMARY OF THE INVENTION

The present invention is achieved to solve the conventional problem described above. The problem to be solved is to provide an optical disk, an apparatus for playing back or apparatus for copying the optical disk, or a method of preventing an illegal use of the optical disk, which can effectively prevent the illegal use of the DVD disk or other optical disks physically or electrically, which infringes the copyright.

An optical disk, an apparatus for playing back and apparatus for copying the optical disk, and a method of preventing an illegal use of the optical disk, according to the present invention which has been achieved to solve the above-mentioned problem, are fundamentally characterized in that they include one of the following elements or a combination of any ones of the elements.

(1) Whether an optical disk is writable or not, is judged in accordance with a disk signal other than disk control information.

(2) An alteration of data is prevented by physically forming a subaltern information region including key information by means of pre-pits.

(3) An alteration of data is prevented by physically forming a sub-groove portion in a subaltern information region including key information.

(4) A second subaltern information region is provided at an inner side position in comparison with a first subaltern information region, and disk control information is divided and stored in the regions.

(5) Key information is stored in a first subaltern information region, positional information of the first subaltern information region is stored in a second subaltern information region, and regular key information is identified by reading the positional information.

More concretely, according to the present invention, (a) an apparatus for playing back an optical disk having a groove, which includes a main information region in which ciphered data information is recorded in the groove, and a subaltern information region for recording disk control information including key information for deciphering the data information, is characterized in that it includes (b) a protective condition judging means for judging whether the data information is protected by a copyright or not on the basis of the disk control information when the data information is played back, (c) a disk judging means for judging whether the optical disk is writable or not on the basis of information other than the disk control information when the data information is played back, and (d) a disk playback preventing means for preventing the optical disk from being played back if it is judged that the data information is protected by the copyright by the protective condition judging means and it is judged that the optical disk is writable by the disk judging means.

As the optical disk used herein, for example, a write-once optical disk may be mentioned. In the apparatus for playing back the optical disk, it is preferable that the disk playback preventing means prevents the optical disk from being played back by preventing the data information from being deciphered.

Meanwhile, in the apparatus for playing back the optical disk, it is preferable that the disk judging means detects at least one of (a) whether the groove is provided with a wobble or not, (b) whether the subaltern information region is provided with a sub-groove portion which connects a predetermined portion of the groove to an adjacent portion of the groove or not, and (c) whether another subaltern information region provided on the optical disk, which is different from said subaltern information region, is provided with a code indicating that the optical disk is writable, or not, (d) and then judges that the optical disk is writable if at least one of the wobble, sub-groove portion and the code is detected.

According to the present invention, (a) an apparatus for copying ciphered data information recorded in a first optical disk to a second optical disk of writable type, in which the first optical disk has a main information region for recording the ciphered data information and a subaltern information region for recording disk control information including key information for deciphering the ciphered data information, is characterized in that it includes (b) a protective condition judging means for judging whether the data information is protected by a copyright or not on the basis of the disk control information when the data information is copied, and (c) a disk copy preventing means for preventing the data information recorded in the first optical disk from being copied to the second optical disk if it is judged that the data information is protected by the copyright by the protective condition judging means.

As the optical disk used herein, for example, a write-once optical disk may be mentioned. In the apparatus for copying the optical disk, it is preferable that the disk copy preventing means prevents the data information from being copied by preventing the data information from being deciphered.

An optical disk of writable type according to the present invention, including (a) a main information region for recording ciphered data information, in which the data information is recorded in a recording layer within a groove extending along a spiral track, in such a manner that the data information can be read using light, (b) a first subaltern information region located at an inner periphery side in comparison with the main information region, and (c) a second subaltern information region located at an inner periphery side in comparison with the first subaltern information region, is characterized in that (d) a disk control information recorded in a subaltern information region of a read only optical disk is prevented from being copied to the first subaltern information region, by dividing disk control information including key information for deciphering the data information into two parts, and recording the parts in the first subaltern information region and the second subaltern information region, respectively.

As the optical disk used herein, for example, a write-once optical disk may be mentioned.

In the optical disk, it is preferable that the disk control information including the key information for deciphering the data information is recorded in the first subaltern information region, while at least positional information of the first subaltern information region is recorded in the second subaltern information region. Further, it is more preferable that the disk control information in the first subaltern information region and the disk control information in the second subaltern information region are formed by means of recording methods different from each other.

Meanwhile, in the optical disk, it is preferable that the disk control information in the first subaltern information region is formed by means of pre-pits. Further, it is more preferable that the disk control information in the second subaltern information region is formed by means of a laser trimming process. Because the laser trimming process can be performed after the disk has been completed, key information of the copyright holder and disk ID information, etc. can be also recorded.

Another optical disk of writable type according to the present invention, including (a) a main information region for recording ciphered data information, in which the data information is recorded in a recording layer within a groove extending along a spiral track, in such a manner that the data information can be read using light, (b) a first subaltern information region located at an inner periphery side in comparison with the main information region, and (c) a second subaltern information region located at an inner periphery side in comparison with the first subaltern information region, is characterized in that (d) disk control information recorded in a subaltern information region of a read only optical disk is prevented from being copied to the first subaltern information region or to the main information region, by providing a sub-groove portion, which connects a predetermined portion of the groove to an adjacent portion of the groove, in the first subaltern information region. As the optical disk used herein, for example, a write-once optical disk may be mentioned.

According to the present invention, a method of preventing an illegal use of an optical disk having, a groove, (a) which includes a main information region in which ciphered data information is recorded in the groove, and a subaltern information region for recording disk control information including key information for deciphering the data information, is characterized in that it includes the steps of (b) judging whether the data information is protected by a copyright or not on the basis of the disk control information when the data information is played back, (c) judging whether the optical disk is writable or not on the basis of information other than the disk control information, and (d) preventing the optical disk from being played back if the data information is protected by the copyright and the optical disk is writable. As the optical disk used herein, for example, a write-once optical disk may be mentioned.

In the method of preventing the illegal use of the optical disk, it is preferable that the optical disk is prevented from being played back by preventing the data information from being deciphered.

Meanwhile, in the method of preventing the illegal use of the optical disk, it is preferable that the information other than the disk control information is at least one in such information set of (a) whether the groove is provided with a wobble or not, (b) whether the subaltern information region is provided with a sub-groove portion which connects a predetermined portion of the groove to an adjacent portion of the groove or not, and (c) whether another subaltern information region which is different from the subaltern information region, is provided with a code indicating that the optical disk is writable, or not, while (d) it is judged that the optical disk is writable if at least one of the wobble, the sub-groove and the code is detected.

According to the present invention, another method of preventing an illegal use of optical disks when ciphered data information recorded in a first optical disk is copied to a second optical disk of writable type, (a) in which first optical disk has a main information region for recording the ciphered data information and a subaltern information region for recording disk control information including key information for deciphering the ciphered data information, is characterized in that it includes the steps of (b) judging whether the data information is protected by a copyright or not on the basis of the disk control information, and (c) preventing the data information recorded in the first optical disk from being copied to the optical disk of writable type if the data information is protected by the copyright. As the optical disk used herein, for example, a write-once optical disk may be mentioned.

According to the present invention, a further method of preventing an illegal use of an optical disk of writable type having (a) a main information region for recording ciphered data information which is recorded in a recording layer within a groove extending along a spiral track in such a manner that the data information can be read using light, a first subaltern information region located at an inner periphery side in comparison with the main information region, and a second subaltern information region located at an inner periphery side in comparison with the first subaltern information region, is characterized in that it includes the step of (b) preventing disk control information recorded in a subaltern information region of a read only optical disk from being copied to the first subaltern information region of the optical disk of writable type, (c) by previously forming the disk control information of the first subaltern information region by means of pre-pits or (d) by providing a sub-groove, which connects a predetermined portion of the groove to an adjacent portion of the groove, in the first subaltern information region. As the optical disk used herein, for example, a write-once optical disk may be mentioned.

According to the present invention, a further method of preventing an illegal use of an optical disk of writable type having (a) a main information region for recording ciphered data information which is recorded in a recording layer within a groove extending along a spiral track in such a manner that the data information can be read using light, a first subaltern information region located at an inner periphery side in comparison with the main information region, and a second subaltern information region located at an inner periphery side in comparison with the main information region, and a second subaltern information region located at an inner periphery side in comparison with the first subaltern information region, is characterized in that it includes the steps (b) preventing disk control information recorded in a subaltern information region of a read only optical disk from being copied to the first subaltern information region of the optical disk of writable type, by previously forming the disk control information of the first subaltern information region by means of pre-pits or by providing a sub-groove, which connects a predetermined portion of the groove to an adjacent portion of the groove, in the first subaltern information region, (c) judging whether the data information recorded in the optical disk of writable type is protected by a copyright or not on the basis of the disk control information recorded in the first subaltern information region when the data information is played back, and (d) preventing the optical disk from being played back if the data information is protected by the copyright. As the optical disk used herein, for example, a write-once optical disk may be mentioned.

In the method of preventing the illegal use of the optical disk, it is preferable that the optical disk is prevented from being played back by preventing the data information from being deciphered.

According to any one of the optical disk, the apparatus for playing back or copying the optical disk, and the method of preventing the illegal use of the optical disk, an illegal use of the optical disk such as a DVD disk, which may infringe a copyright, can be physically or electrically prevented with a good efficiency.

BRIEF DESCRIPTION OF DRAWINGS

FIG. 7A is a plan view of a DVD disk provided with a disk judging code, while

DETAILED DESCRIPTION OF THE INVENTION

Hereinafter, embodiments of the present invention will be concretely described.

Embodiment 1

Hereinafter, Embodiment 1 will be described while taking the case that a DVD disk is played back, fundamentally, with reference to FIG. 1 and FIG. 5. In Embodiment 1, whether a DVD disk to be played back is a writable DVD disk or not, is judged in accordance with whether the disk is provided with a wobble or not.

Figure 1:
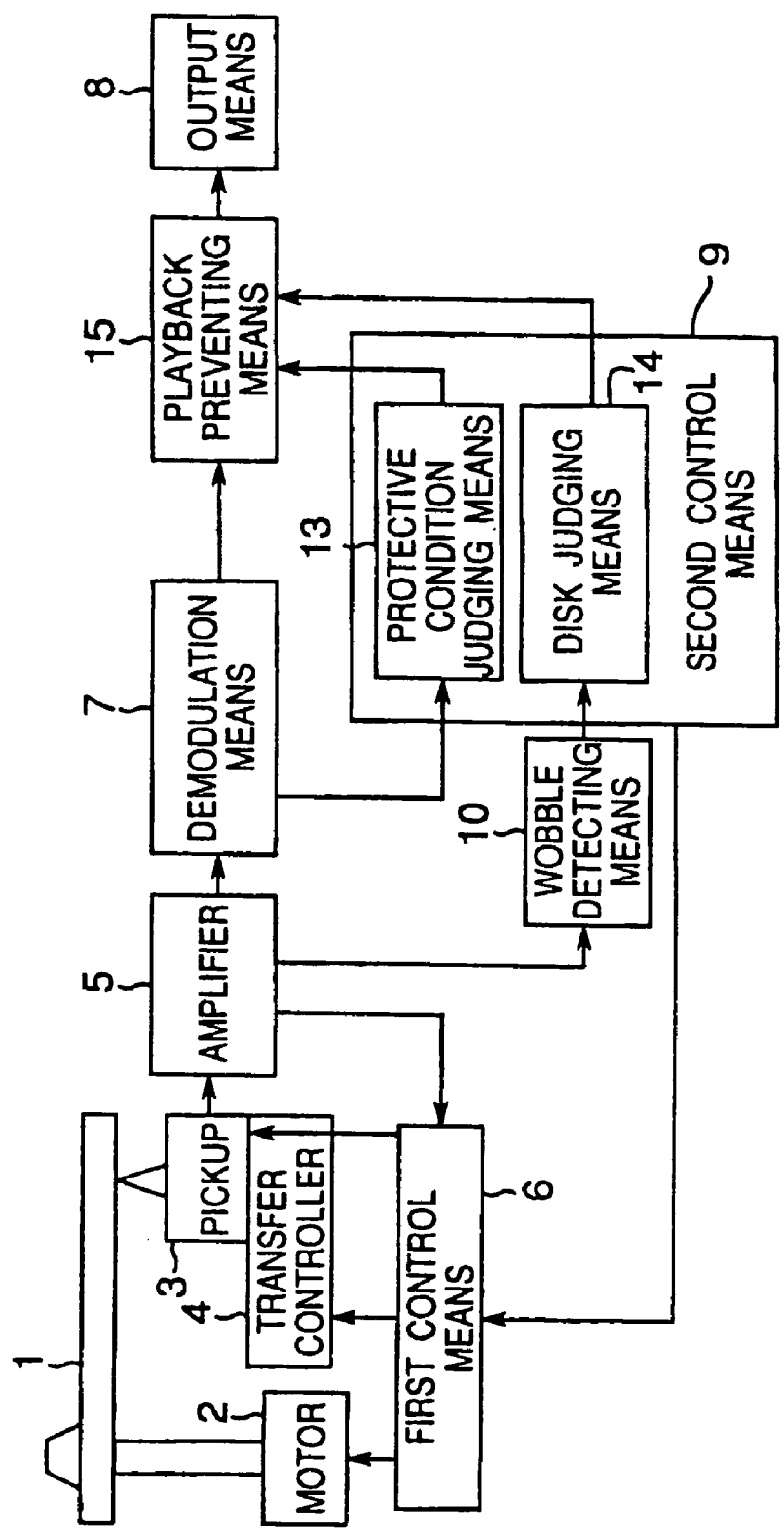
FIG. 1 is a block diagram of a DVD player according to Embodiment 1 of the present invention.

FIG. 1 is a block diagram showing the construction of the conventional DVD player according to the present invention. In FIG. 1, 1 denotes the DVD disk which records data information such as images or voices to be played back. In the DVD disk 1, the data information is ciphered and recorded in order to generally protect its copyright from an illegal copying, and as a consequence, key information for deciphering the data information is also recorded in a predetermined region on the DVD disk 1.

Meanwhile, 3 denotes an optical pickup which reads record signals of the DVD disk 1 using a laser ray. 4 denotes a transfer controller which moves the optical pickup 3 in the radial direction of the DVD disk 1 in order to read the record signals at arbitrary positions on the DVD disk 1. 2 denotes a disk motor which rotates the DVD disk 1. 6 denotes a first control means which controls the optical pickup 3, the transfer controller 4 and the disk motor 2. 5 denotes an amplifier which amplifies the signals which have been read by the optical pickup 3. 7 denotes a demodulation means which analyzes the signals which have been read from the DVD disk 1 and digitized, and reconstructs the data such as the original images or music.

10 denotes a wobble detecting means which generates and detects a wobble signal obtained from the focus error signal, the tracking error signal or the like. The concrete construction of the wobble will be described later (see FIG. 5). 9 denotes a second control means which includes a protective condition judging means 13 into which a signal is inputted from the demodulation means 7, and a disk judging means 14 into which a signal is inputted from the wobble detecting means 10. The protective condition judging means 13 extracts and judges a code indicating existence of a copyright protection from disk control information in the detected signals which are demodulated. The disk judging means 14 judges whether the DVD disk 1 is a writable DVD disk or not, in accordance with the existence of the wobble signal.

15 denotes a playback preventing means which receives the judgement results of the protective condition judging means 13 and the disk judging means 14. Thus, the playback preventing means 15 prevents the signal obtained by demodulating the data information from being outputted from an output means 8, if the data information of the DVD disk 1 is protected by the copyright and the DVD disk 1 is writable.

Figure 5:
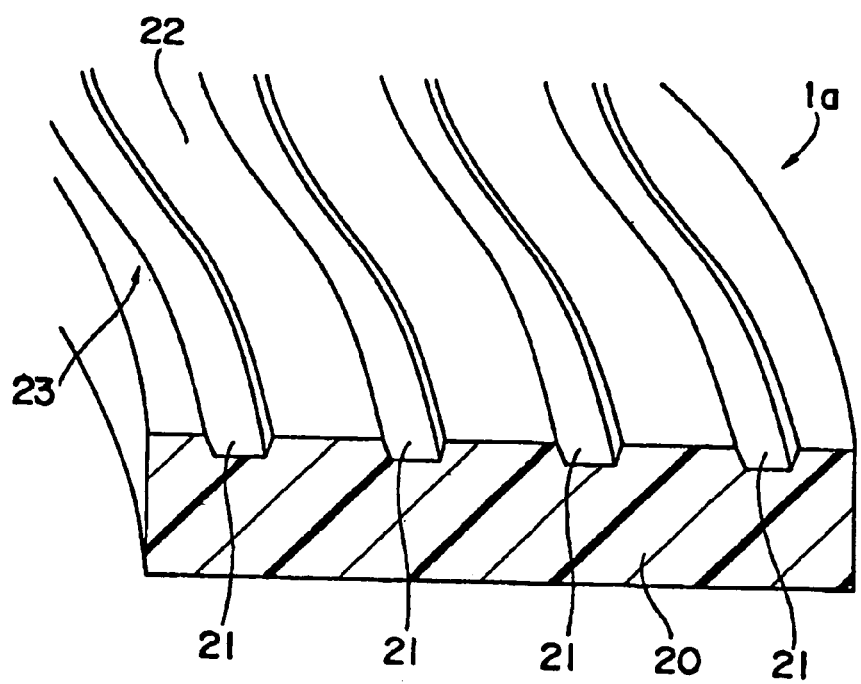
FIG. 5 is a partially sectioned perspective view of a DVD disk provided with a wobble.

FIG. 5 is a partially sectioned perspective view of a write-once DVD disk with a wobble. As shown in FIG. 5, in the DVD disk 1a, a groove 21 (groove portion) or its track (spiral), which is formed on a surface of a substrate 20, meanders. The meandering structure (state) of the groove 21 is referred to as a wobble 23. Hereupon, a land portion 22 is formed between a portion of the groove 21 and an adjacent portion of the groove 21 in the radial direction of the disk.

As described above, in the DVD player according to Embodiment 1, it is judged whether the groove 21 is provided with the wobble 23 or not. Then, it is judged that the DVD disk 1 is a writable optical disk if the wobble 23 is detected. Thus, if the data information is protected by the copyright, the playback of the DVD disk is prevented. Therefore, an illegal use of the DVD disk, which infringes the copyright, may be effectively prevented in the physical or electrical manner.

Embodiment 2

Figure 2:
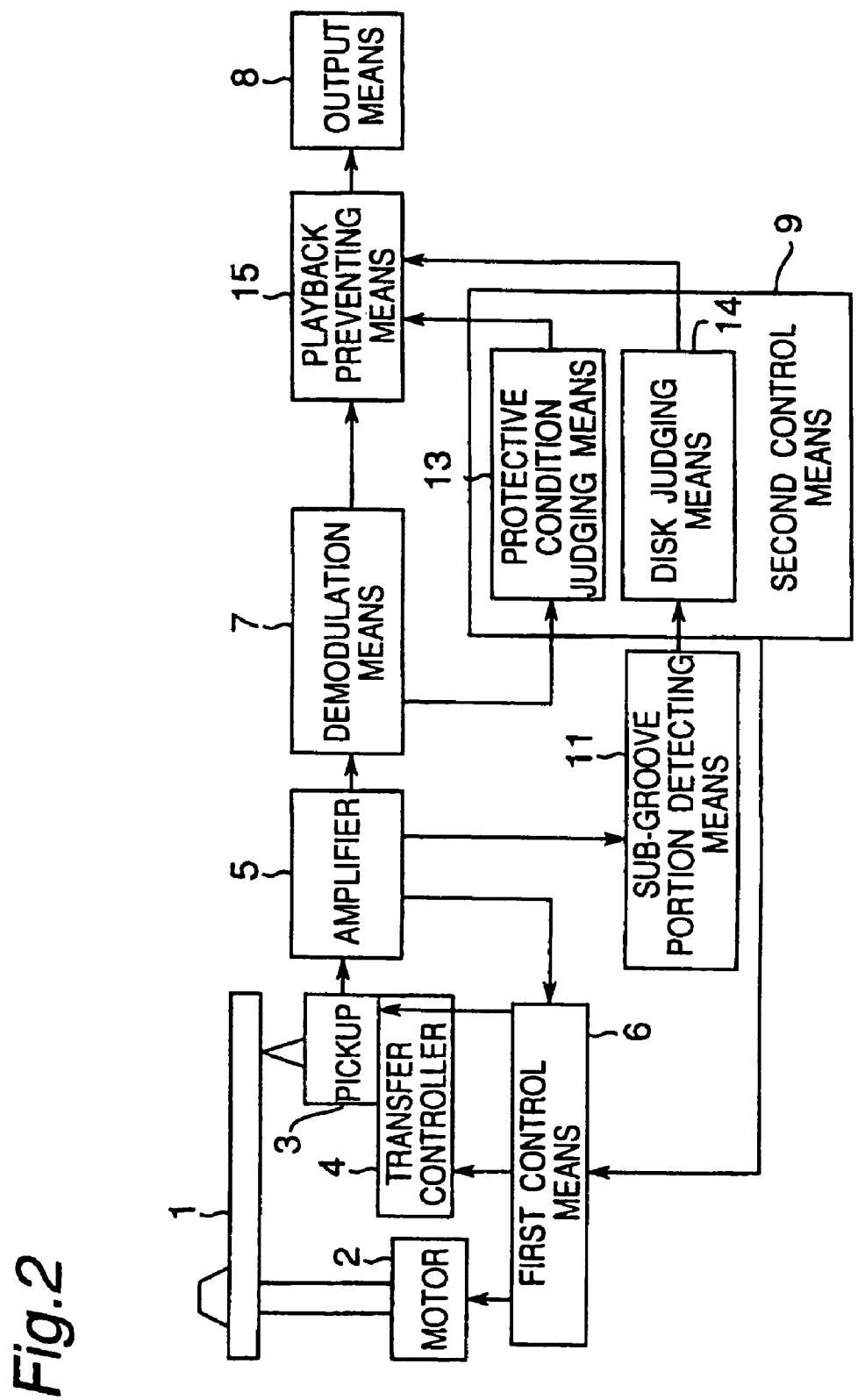
FIG. 2 is a block diagram of a DVD player according to Embodiment 2 of the present invention.
Figure 6:
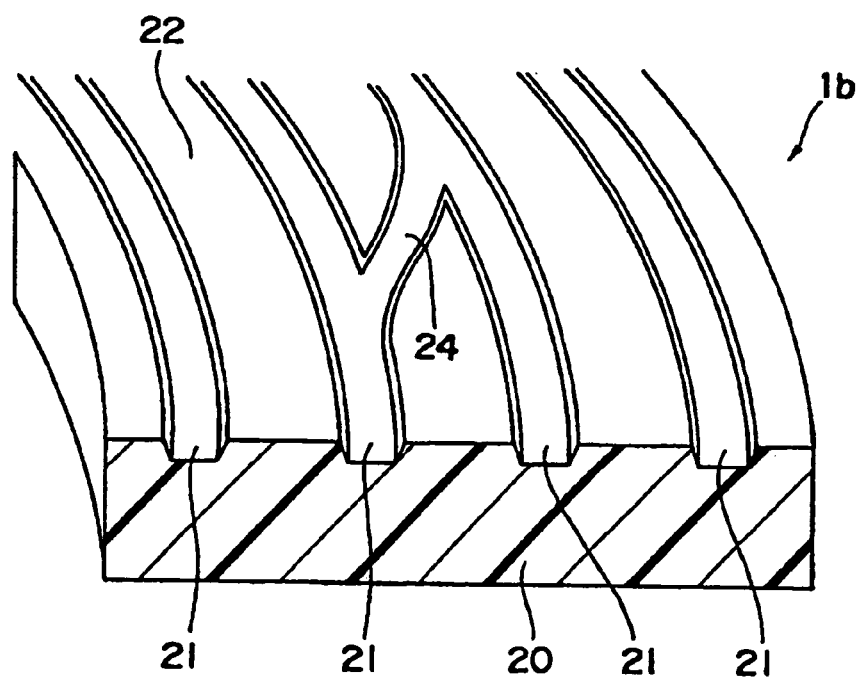
FIG. 6 is a partially sectioned perspective view of a DVD disk provided with a sub-groove portion.

Hereinafter, Embodiment 2 will be described while taking the case that a DVD disk is played back, fundamentally, with reference to FIG. 2 and FIG. 6. In Embodiment 2, it is judged whether a DVD disk to be played back is a writable DVD disk or not, in accordance with existence of a sub-groove portion. Hereupon, fundamental portions in FIG. 2 and FIG. 6 are common with those in FIG. 1 and FIG. 5, respectively. Therefore, in order to avoid duplicated descriptions, the members or elements which are common with the both figures, are given the same reference numbers, and then the description as to the members or elements are omitted.

As shown in FIG. 2, in Embodiment 2, the wobble detecting means 10, which is provided in Embodiment 1, is not provided. Instead of that, a sub-groove portion detecting means 11 is provided. Thus, the sub-groove portion detecting means 11 generates and detects a signal from the sub-groove portion obtained from the focus error signal, the tracking error signal or the like. The other construction is as same as that of the DVD player according to Embodiment 1 (FIG. 1). The concrete construction of the sub-groove portion will be descried later (see FIG. 6).

Thus, in the DVD player according to Embodiment 2, the second control means 9 includes the protective condition judging means 13 into which a signal from the demodulation means 7 is inputted, and the disk judging means 14 into which a signal from the sub-groove portion detecting means 11 is inputted. Then, the protective condition judging means 13 extracts and judges a code indicating existence of the copyright protection from the disk control information in the detected signals which are demodulated, while the disk judging means 14 judges whether the DVD disk is a writable DVD disk or not, in accordance with existence of the signal from the sub-groove portion. The playback preventing means 15 receives the judgement results of the protective condition judging means 13 and the disk judging means 14, and then prevents the signal. obtained by demodulating the data information from being outputted from the output means 8 if the data information is protected by the copyright and if the DVD disk is writable. Hereupon, if the incident rays arrive at the sub-groove portion, the optical. pickup moves to an adjacent portion of the groove via the sub-groove portion, in accordance with the control signal from the tracking error signal. Therefore, it may be also possible to make the reading of the disk control information such as the key information, etc. impossible, by providing the sub-groove portion.

FIG. 6 is a partially sectioned perspective view of a write-once DVD disk provided with a sub-groove portion. As shown in FIG. 6, in the DVD disk 1b, on a surface of the substrate 20 (subaltern information region), there is formed a sub-groove 24 which connects a predetermined position of the groove 21 to an inner side adjacent position of the groove 21. Thus, in the DVD player, it is judged whether the DVD disk is writable or not, in accordance with existence of the sub-groove portion 24. At the occasion, in the recording apparatus or the copying apparatus, it may be possible to make the reading of the key information impossible by providing the sub-groove portion before the control information region for preventing the copy of the key information or the like. Then, it may be possible to strengthen the copy preventing function by moving the pickup to the former position after having passed through a certain region. Hereupon, the pickup is moved by means of another sub-groove portion which leads the pickup to the former position, or by means of the track jump.

As described above, in the DVD player according: to Embodiment-2, it is detected whether the sub-groove portion 24 exists or not. If the sub-groove portion 24 is detected, it is judged that the DVD disk 1 is a writable optical disk. Then, if the data information is protected by the copyright, the playback of the DVD disk is prevented. Therefore, an illegal use of the DVD disk, which infringes the copyright, may be effectively prevented in the physical or electrical manner.

Embodiment 3

Figure 3:
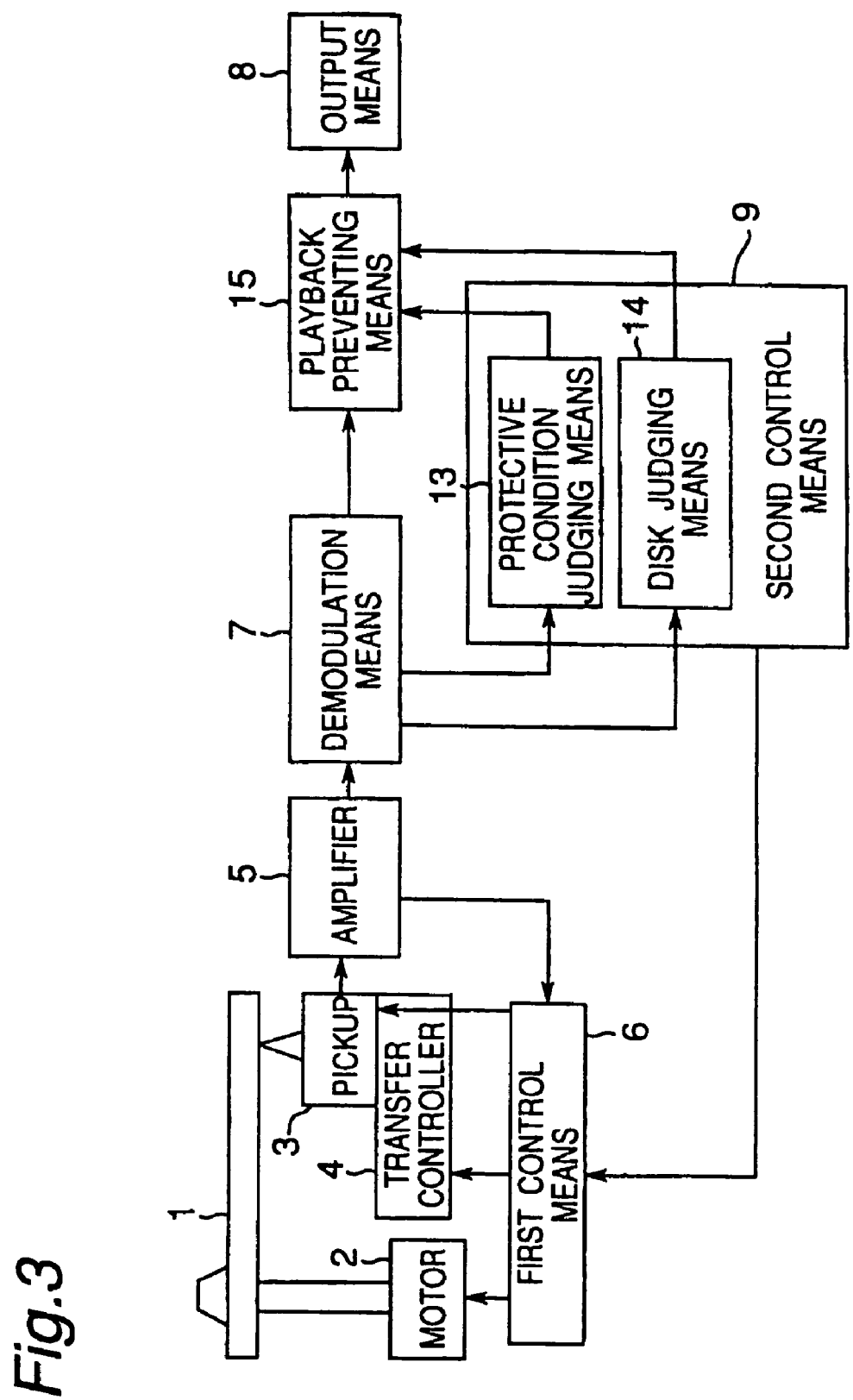
FIG. 3 is a block diagram of a DVD player according to Embodiment 3 or 4 of the present invention.

Hereinafter, Embodiment 3 will be described while taking the case that a DVD disk is played back, fundamentally, with reference to FIG. 3 and FIG. 7. In Embodiment 3, it is judged whether a DVD disk to be played back is a writable DVD disk or not, in accordance with whether a second subaltern information region (inner periphery side in comparison with a first subaltern information region), which is different from a first subaltern information region (ordinary subaltern information region), is provided with a code (hereinafter, referred to "disk judging code") indicating that the DVD disk is writable, or not. Hereupon, fundamental portions in FIG. 3 are common with those in FIG. 1. Therefore, in order to avoid duplicated descriptions, the members or elements which are common with the both figures are given the same reference numbers, and then the description as to the member or elements are omitted.

As shown in FIG. 3, in Embodiment 3, the disk judging means 14 composing the second control means 9 judges whether the disk judging code, which indicates that the DVD disk is writable, exists or not in the second subaltern information region, on the basis of the signal inputted from the demodulation means 7. The other construction is as same as that of the DVD player according to Embodiment 1 (FIG. 1). The concrete construction of the second subaltern information region will be descried later (see FIG. 7).

Thus, in the DVD player according to Embodiment 3, the protective condition judging means 13 composing the second control means 9 extracts and judges a code indicating existence of the copyright protection from the disk control information in the detected signals which are demodulated, while the disk judging means 14 judges whether the DVD disk is a writable DVD disk or not, in accordance with existence of the disk judging code. The playback preventing means 15 receives the judgement results of the protective condition judging means 13 and the disk judging means 14, and then prevents the signal obtained by demodulating the data information from being outputted from the output means 8 if the data information is protected by the copyright and if the DVD disk is writable.

Figure 7A:
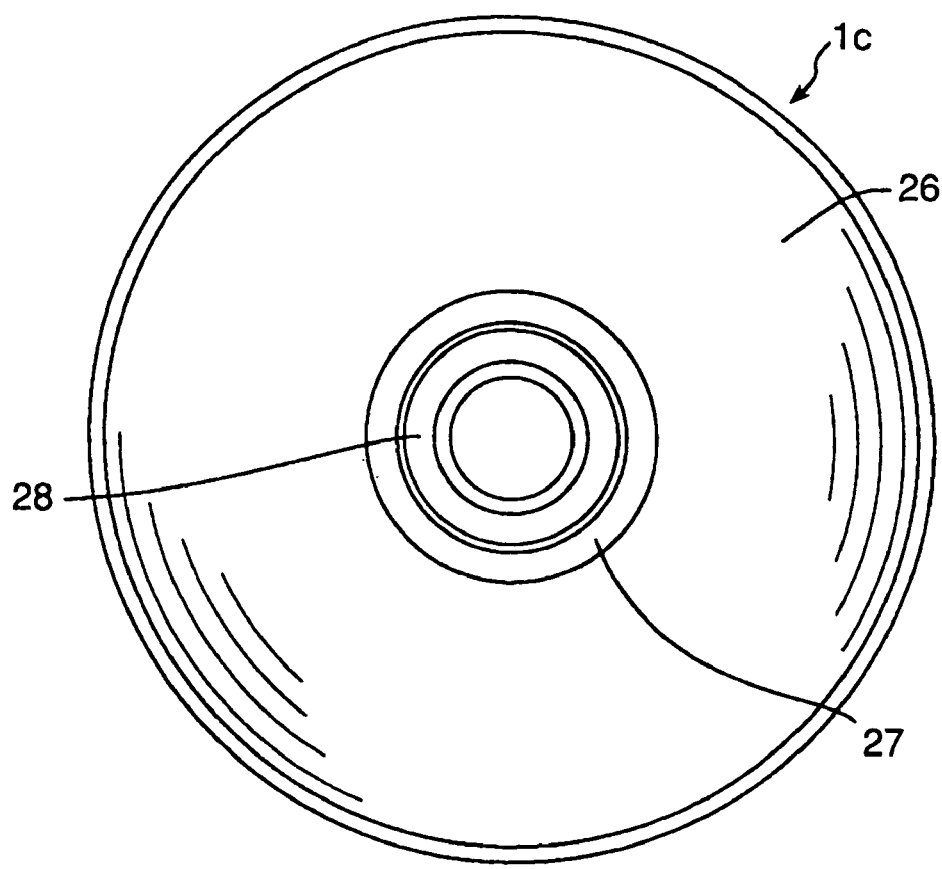
Figure 7B:
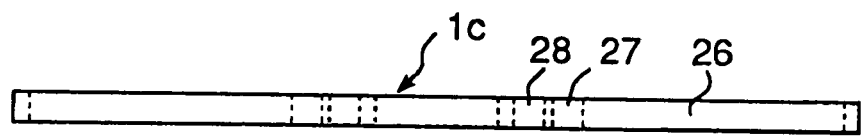
FIG. 7B is a side view of the DVD disk shown in FIG. 7A.

FIG. 7A and FIG. 7B are a plan view and a side view of a write-once DVD disk provided with a second subaltern information region, respectively. As shown in FIG. 7A and FIG. 7B, in the DVD disk 1c, there are provided a main information region 26 for recording ciphered data information which is recorded in a recording layer within a groove extending along a spiral track in such a manner that the data information can be read using light, a first subaltern information region 27 located at an inner periphery side in comparison with the main information region 26, and a second subaltern information region 28 located at an inner periphery side in comparison with the first subaltern information region 27, wherein disk control information including key information for deciphering the data information is divided and recorded in the first and second subaltern information regions 27,28. Hereupon, in the second subaltern information region 28, there are formed a disk judging code (for example, bar code) indicating that the DVD disk is a writable DVD disk, positional information of the first subaltern information region 27, and so on. Thus, in the DVD player, it is judged whether the DVD disk is writable or not, in accordance with existence of the disk judging code.

As described above, in the DVD player according to Embodiment 3, it is detected whether the disk judging code exists or not in the second subaltern information region 28. If the disk judging code is detected, it is judged that the DVD disk 1 is a writable optical disk. Then, if the data information is protected by the copyright, the playback of the DVD disk is prevented. Therefore, an illegal use of the DVD disk, which infringes the copyright, may be effectively prevented in the physical or electrical manner. It is probable that if an illegal first subaltern information region is recorded in the main information region, the disk control information such as the key information or the like may be illegally copied so that the ciphered data may be demodulated. However, if the second subaltern information region, which is located at the most inner position, is formerly read, the normal position of the first subaltern information region can be identified in the present invention so that the illegal copying may be prevented. Hereupon, the key information may be recorded in the second subaltern information region.

Embodiment 4

Hereinafter, Embodiment 4 will be described while taking the case that a DVD disk is played back, fundamentally, with reference to FIG. 3 described above and FIG. 8. In Embodiment 4, it is judged whether a DVD disk to be played back is a writable DVD disk or not, in accordance with whether pre-pits exist in a subaltern information region.

As shown in FIG. 3, in Embodiment 4, the disk judging means 14 composing the second control means 9 judges whether the pre-pits exist or not in the subaltern information region, on the basis of the signal inputted from the demodulation means 7. The other construction is as same as that of the DVD player according to Embodiment 1 (FIG. 1). The concrete construction of the pre-pits will be descried later (see FIG. 8).

Thus, in the DVD player according to Embodiment 4, the protective condition judging means 13 composing the the second control means 9 extracts and judges a code indicating existence of the copyright protection from the disk control information in the detected signals which are demodulated, while the disk judging means 14 judges whether the DVD disk is a writable DVD disk or not, in accordance with existence of the pre-pits and pre-pit information. The playback preventing means 15 receives the judgement results of the protective condition judging means 13 and the disk judging means 14, and then prevents the signal obtained by demodulating the data information from being outputted from the output means 8 if the data information is protected by the copyright and if the DVD disk is writable.

Figure 8:
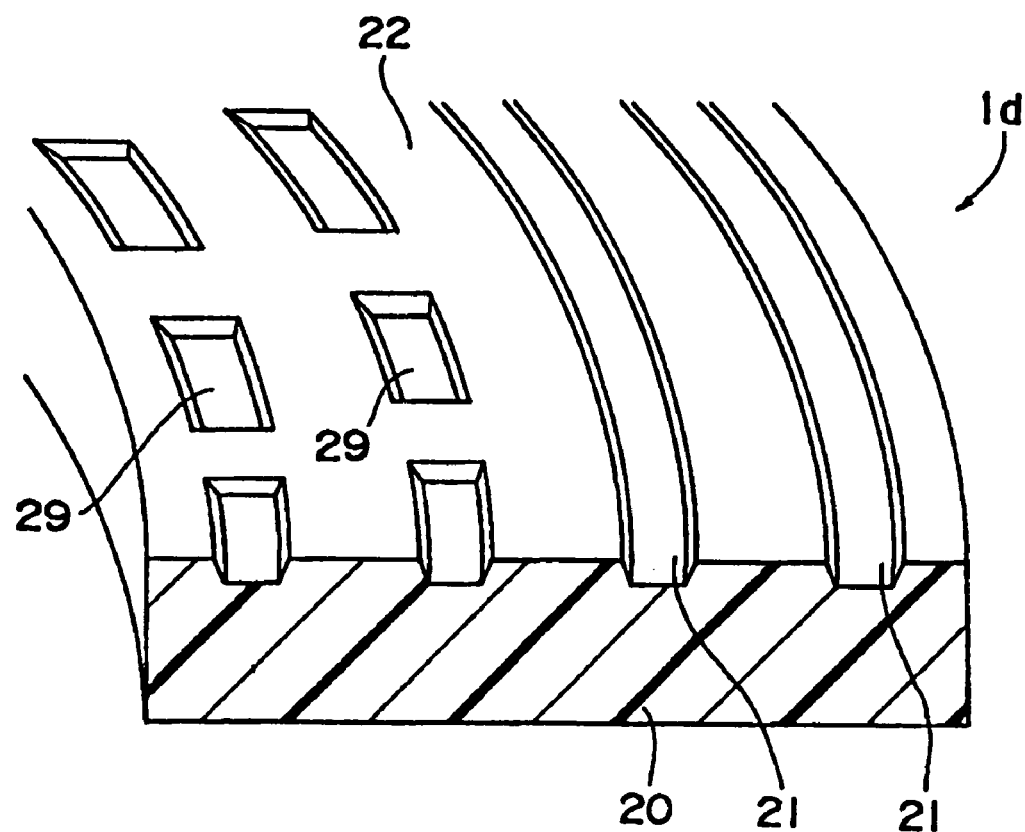
FIG. 8 is a partially sectioned perspective view of a DVD disk provided with pre-pits.
Figure 9:
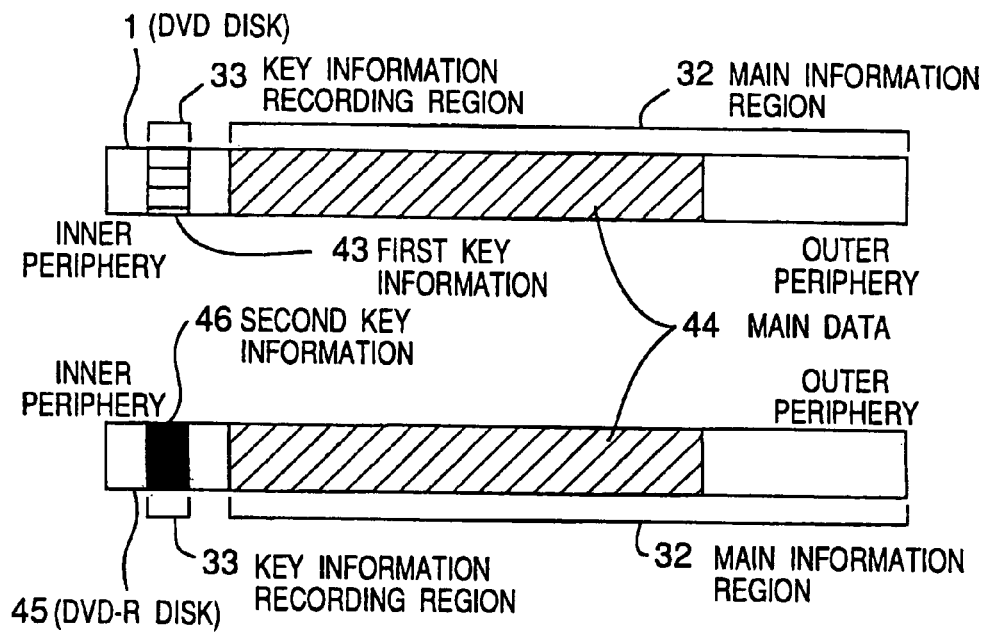
FIG. 9 is a view showing a recording structure of a DVD disk on the market.
Figure 10:
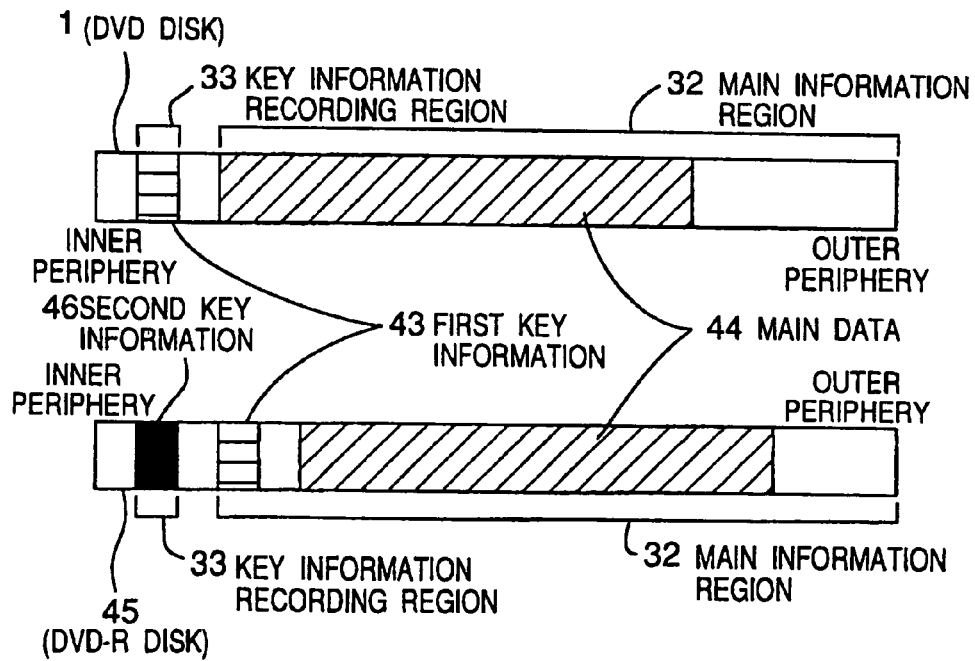
FIG. 10 is a view showing a recording structure when key information and contents of a DVD disk on the market are copied in a writable DVD disk.
Figure 11:
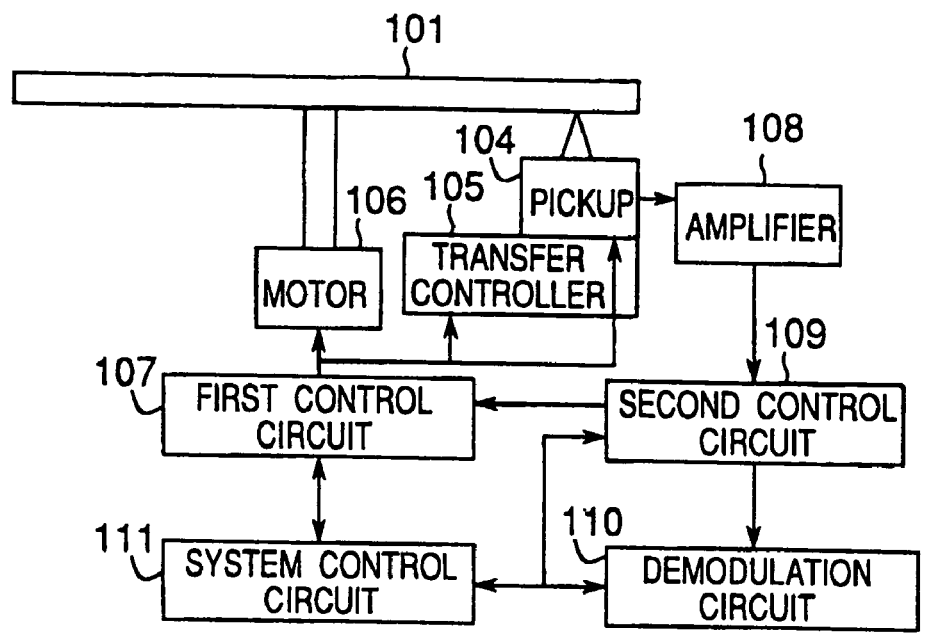
FIG. 11 is a block diagram of a conventional DVD player.
Figure 12:
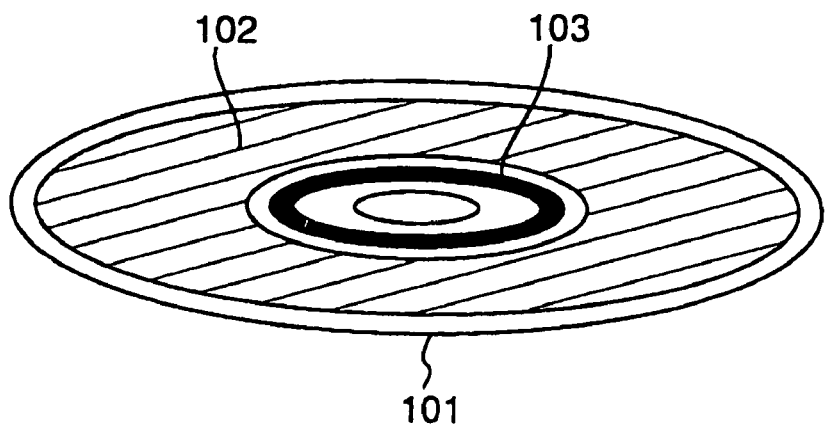
FIG. 12 is a perspective view of a conventional DVD disk.

FIG. 8 is a partially sectioned perspective view of a write-once DVD disk provided with pre-pits. As shown in FIG. 8, in the DVD disk 1d, pre-pits 29 are provided in the subaltern information region of the substrate 20. Thus, in the DVD player, it is judged whether the DVD disk is writable or not, in accordance with existence of the pre-pits 29.

As described above, in the DVD player according to Embodiment 4, it is detected whether the pre-pits 29 exist or not in the subaltern information region. If the pre-pits 29 are detected, it is judged that the DVD disk 1 is a writable optical disk. Then, if the data information is protected by the copyright, the playback of the DVD disk is prevented. Therefore, an illegal use of the DVD disk, which infringes the copyright, may be effectively prevented in the physical or electrical manner.

Embodiment 5

Figure 4:
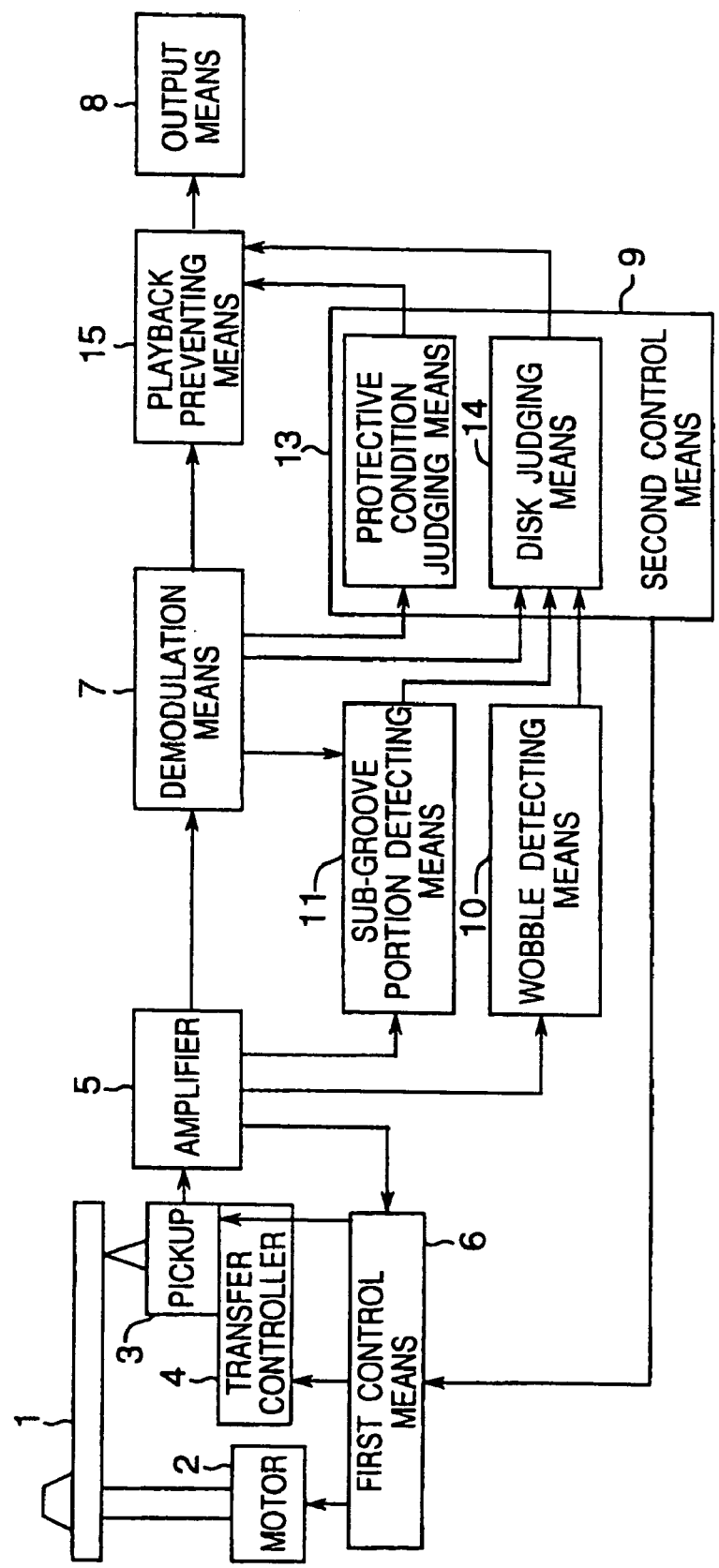
FIG. 4 is a block diagram of a DVD player according to Embodiment 5 of the present invention.

Hereinafter, Embodiment 5 will be described while taking the case that a DVD disk is played back, fundamentally, with reference to FIG. 4. In Embodiment 5, it is judged whether a DVD disk to be played back is a writable DVD disk or not, on the basis of a plurality of elements in the group of a wobble, a sub-groove portion, a disk judging code and pre-pits. Hereupon, fundamental portions in FIG. 4 are common with those in FIG. 1. Therefore, in order to avoid duplicated descriptions, the members or elements which are common with the both figures; are given the same reference numbers, and then the description as to the members or elements are omitted.

As shown in FIG. 4, in Embodiment 5, the wobble detecting means 10 is provided the same as in the case of Embodiment 1, and further the sub-groove portion detecting means 11 is provided the same as in the case of Embodiment 2. Moreover, the disk judging means 14 composing the second control means 9 can judge existence of each of the disk judging code and the pre-pits the same as in the case of Embodiments 3, 4. The other construction is as same as that of the DVD player according to Embodiment 1 (FIG. 1).

Thus, in the DVD player according to Embodiment 5, it is judged whether the DVD disk 1 is a writable DVD disk or not, on the basis of a plurality of elements in the group of existence of the wobble, existence of the sub-groove portion, existence of the disk judging code and existence of the pre-pits. Therefore, the accuracy of the judgement of the disk type may be improved in comparison with the cases of not, with Embodiments 1 to 4 so that an illegal use of the DVD disk, which infringes the copyright, may be prevented more effectively.

As described above, in the optical disk according to the present invention, it is detected at least one of whether the groove is provided with the wobble or not, whether the subaltern information region is provided with the sub-groove portion which connects the predetermined portion of the groove to the adjacent portion of the groove or riot, and whether the second subaltern information region, which is different from the ordinary subaltern information region, is provided with the code indicating, that the optical disk is writable. If at least one of the wobble, the sub-groove portion and the code is detected, it is judged that the optical disk is writable. Then, if the data information is protected by the copyright, the playback or copy of the optical disk is prevented. Therefore, an illegal use of the optical disk, which infringes the copyright, may be effectively prevented in the physical or electrical manner.

INDUSTRIAL APPLICABILITY

As described above, the optical disk, the apparatus for playing back and apparatus for copying the optical disk, and the method of preventing the illegal use of the optical disk, according to the present invention, are useful as an optical apparatus which can effectively prevent the illegal use of the DVD disk or other optical disks in physical or electrical manner, and particularly are suitable for use as a means to propagate intellectual works such as images, voices or the like while protecting the copyrights thereof.

What is claimed is:

1. An apparatus for playing back an optical disk having a groove, which includes a main information region in which ciphered data information is recorded in the groove, and a subaltern information region for recording disk control information including key information for deciphering the data information, the apparatus comprising:
   protective condition judging means for judging whether or not the data information is protected by a copyright on the basis of the disk control information when the data information is played back;
   a disk judging means for judging whether or not the optical disk is writable on the basis of information other than the disk control information when the data information is played back; and
   a disk playback preventing means for preventing the optical disk from being played back if the protective condition judging means judges that the data information is protected by the copyright and the disk judging means judges that the optical disk is writable.

2. The apparatus for playing back the optical disk according to claim 1, wherein the optical disk is a write-once optical disk.

3. The apparatus for playing back the optical disk according to claim 2, wherein the disk playback preventing means prevents the optical disk from being played back by preventing the data information from being deciphered.

4. The apparatus for playing back the optical disk according to claim 1, wherein the disk judging means detects whether or not the groove is provided with a wobble, and then judges that the optical disk is writable if the wobble is detected.

5. The apparatus for playing back the optical disk according to claim 1, wherein the disk judging means detects whether or not the subaltern information region is provided with a sub-groove portion which connects a predetermined portion of the groove to an adjacent portion of the groove, and then judges that the optical disk is writable if the sub-groove portion is detected.

6. The apparatus for playing back the optical disk according to claim 1, wherein the disk judging means detects whether or not another subaltern information region provided on the optical disk, which is different from the subaltern information region, is provided with a code indicating that the optical disk is writable, and then judges that the optical disk is writable if the code is detected.

7. The apparatus for playing back the optical disk according to claim 1, wherein the disk judging means detects at least one of whether or not the groove is provided with a wobble, whether or not the subaltern information region is provided with a sub-groove portion which connects a predetermined portion of the groove to an adjacent portion of the groove, and whether or not another subaltern information region provided on the optical disk, which is different from the subaltern information region, is provided with a code indicating that the optical disk is writable, and then judges that the optical disk is writable if at least one of the wobble, the sub-groove portion and the code is detected.

8. An optical disk of writable type comprising:
   a main information region for recording ciphered data information, the data information being recorded in a recording layer within a groove extending along a spiral track, such that the data information is readable using light;
   a first subaltern information region located at an inner periphery side of the optical disk in comparison with the main information region; and
   a second subaltern information region located at an inner periphery side of the optical disk in comparison with the first subaltern information region, wherein
   disk control information recorded in a subaltern information region of a read only optical disk is prevented from being copied to the first subaltern information region of the optical disk, by dividing disk control information including key information for deciphering the data information into two parts, and recording a first of the two parts in the first subaltern information region and a second of the two parts in the second subaltern information region, respectively.

9. The optical disk according to claim 8, wherein the optical disk is a write-once optical disk.

10. The optical disk according to claim 9, wherein the disk control information including the key information for deciphering the data information is recorded in the first subaltern information region, while least positional information of the first subaltern information region is recorded in the second subaltern information region.

11. The optical disk according to claim 8, wherein the disk control information in the first subaltern information region and the disk control information in the second subaltern information region are formed by different recording methods.

12. The optical disk according to claim 11, wherein the disk control information in the first subaltern information region is formed by pre-pits.

13. The optical disk according to claim 11, wherein the disk control information in the second subaltern information region is formed by a laser trimming process.

14. An optical disk of writable type comprising:
a main information region for recording ciphered data information, the data information being recorded in a recording layer within a groove extending along a spiral track, such that the data information is readable using light;
a first subaltern information region located at an inner periphery side of the optical disk in comparison with the main information region; and
a second subaltern information region located at an inner periphery side of the optical disk in comparison with the first subaltern information region, wherein
disk control information recorded in a subaltern information region of a read only optical disk is prevented from being copied to the first subaltern information region of the optical disk or to the main information region of the optical disk, by providing a sub-groove portion, which connects a predetermined portion of the groove to an adjacent portion of the groove, in the first subaltern information region.

15. The optical disk according to claim 14, wherein the optical disk is a write-once optical disk.

16. A method of preventing an illegal use of an optical disk having a groove, which includes a main information region in which ciphered data information is recorded in the groove, and a subaltern information region for recording disk control information including key information for deciphering the data information, the method comprising:
judging whether or not the data information is protected by a copyright on the basis the disk control information when the data information is played back;
judging whether or not the optical disk is writable on the basis of information other than the disk control information; and
preventing the optical disk from being played back if the data information is protected by the copyright and the optical disk is writable.

17. The method of preventing the illegal use of the optical disk according to claim 16, wherein the optical disk is a write-once optical disk.

18. The method of preventing the illegal use of the optical disk according to claim 17, wherein the preventing of the optical disk from being played back comprises preventing the data information from being deciphered.

19. The method of preventing the illegal use of the optical disk according to claim 16, wherein the information other than the disk control information is information of whether or not the groove is provided with a wobble and
the judging of whether or not the optical disk is writable judges that the optical disk is writable if the wobble is detected.

20. The method of preventing the illegal use of the optical provided with a sub-groove portion which connects a disk according to claim 16, wherein the information other than the disk control information is information of whether or not the subaltern information region is provided with a sub-groove portion which connects a predetermined portion of the groove to an adjacent portion of the groove, and
the judging of whether or not the optical disk is writable judges that the optical disk is writable if the sub-groove portion is detected.

21. The method of preventing the illegal use of the optical disk according to claim 16, wherein the information other than the disk control information is information of whether or not another subaltern information regions, which is different from the subaltern information region, is provided with a code indicating that the optical disk is writable, and
the judging of whether or not the optical disk is writable judges it is judged that the optical disk is writable if the code is detected.

22. The method of preventing the illegal use of the optical disk according to claim 16, wherein the information other than the disk control information is at least one of whether or not the groove is provided with a wobble, whether or not the subaltern information region is provided with a sub-groove portion which connects a predetermined portion of the groove to an adjacent portion of the groove, and whether or not another subaltern information region which is different from subaltern information region, is provided with a code indicating that the optical disk is writable, and
the judging, of whether or not the optical disk is writable judges that the optical disk is writable if at least one of the wobble, the sub-groove and the code is detected.

23. A method of preventing an illegal use of an optical disk of writable type having a main information region for recording ciphered data information which is recorded in a recording layer within a groove extending along a spiral track such that the data information readable using light, a first subaltern information region located at an inner periphery side of the optical disk in comparison with the main information region, and a second subaltern information region located at an inner periphery side of the optical disk in comparison with the first subaltern information region, the method comprising:
preventing disk control information recorded in a subaltern information region of a read only optical disk from being copied to the first subaltern information region of the optical disk of writable type, by previously forming disk control information of the first subaltern information region by pre-pits.

24. A method of preventing an illegal use of an optical disk of writable type having a main information region for recording ciphered data information which is recorded in a recording layer within a groove extending along a spiral track such that the data information is readable using light, a first subaltern information region located at an inner periphery side of the optical disk in comparison with the main information region, and a second subaltern information region located at an inner periphery side of the optical disk in comparison with the first subaltern information region, the method comprising:
preventing disk control information recorded in a subaltern information region of a read only optical disk from being copied to the first subaltern information region of the optical disk of writable type, by providing a sub-groove, which connects a predetermined portion of the groove to an adjacent portion of the groove, in the first subaltern information region.

25. A method of preventing an illegal use of an optical disk of writable type having a main information region for recording ciphered data information which is recorded in a recording layer within a groove extending along a spiral track such that the data information is readable using light, a first subaltern information region located at an inner periphery side of the optical disk in comparison with the main information region, and a second subaltern information region located at an inner periphery side of the optical disk in comparison with the first subaltern information region, the method comprising:

preventing disk control information recorded in a subaltern information region of a read only optical disk from being copied to the first subaltern information region of the optical disk of writable type, by previously forming disk control information of the first subaltern information region by pre-pits;

judging whether or not the data information recorded in the optical disk of writable type is protected by copyright on the basis of the disk control information recorded in the first subaltern information region when the data information is played back; and preventing the optical disk from being played back if the data information is protected by the copyright.

26. A method of preventing an illegal use of an optical disk of writable type having a main information region for recording ciphered data information which is recorded in a recording layer within a groove extending along a spiral track such that the data information is readable using light, a first subaltern information region located at an inner periphery side of the optical disk in comparison with the main information region, and a second subaltern information region located at an inner periphery side of the optical disk in comparison with the first subaltern information region, the method comprising:

preventing disk control information recorded in a subaltern information region of a read only optical disk from being copied to the first subaltern information region of the optical disk of writable type, by providing a sub-groove, which connects a predetermined portion of the groove to an adjacent portion of the groove, in the first subaltern information region;

judging whether or not the data information recorded in the optical disk of writable type is protected by copyright on the basis of the disk control information recorded in the first subaltern information region when the data information is played back; and preventing the optical disk from being played back if the data information is protected by the copyright.

27. The method of preventing the illegal use of the optical disk according to claim 25, wherein the optical disk is a write-once optical disk.

28. The method of preventing the illegal use of the optical disk according to claim 27, wherein the preventing of the optical disk from being played back comprises preventing the data information from being deciphered.

29. The apparatus for playing back the optical disk according to claim 2, wherein the disk judging means detects whether or not the groove is provided with a wobble, and then judges that the optical disk is writable if the wobble is detected.

30. The apparatus for playing back the optical disk according to claim 3, wherein the disk judging means detects whether or not the groove is provided with a wobble, and then judges that the optical disk is writable if the wobble is detected.

31. The apparatus for playing back the optical disk according to claim 2, wherein the disk judging means detects whether or not the subaltern information region is provided with a sub-groove portion which connects a predetermined portion of the groove to an adjacent portion of the groove, and then judges that the optical disk is writable if the sub-groove portion is detected.

32. The apparatus for playing back the optical disk according to claim 3, wherein the disk judging means detects whether or not the subaltern information region is provided with a sub-groove portion which connects a predetermined portion of the groove to an adjacent portion of the groove, and then judges that the optical disk is writable if the sub-groove portion is detected.

33. The apparatus for playing back the optical disk according to claim 2, wherein the disk judging means detects whether or not another subaltern information region provided on the optical disk, which is different from the subaltern information region, is provided with a code indicating that the optical disk is writable, or not, and then judges that the optical disk is writable if the code is detected.

34. The apparatus for playing back the optical disk according to claim 3 wherein the disk judging means detects whether or not another subaltern information region provided on the optical disk, which is different from the subaltern information region, is provided with a code indicating that the optical disk is writable, and then judges that the optical disk is writable if the code is detected.

35. The apparatus for playing back the optical disk according to claim 2, wherein the disk judging means detects at least one of whether or not the groove is provided with a wobble, whether or not the subaltern information region is provided with a sub-groove portion which connects a predetermined portion of the groove to an adjacent portion of the groove, and whether or not another subaltern information region provided on the optical disk, which is different from the subaltern information region, is provided with a code indicating that the optical disk is writable, and then judges that the optical disk is writable if at least one of the wobble, the sub-groove portion and the code is detected.

36. The apparatus for playing back the optical disk according to claim 3, wherein the disk judging means detects at least one of whether or not the groove is provided with a wobble, whether or not the subaltern information region is provided with a sub-groove portion which connects a predetermined portion of the groove to an adjacent portion of the groove, and whether or not another subaltern information region provided on the optical disk, which is different from the subaltern information region, is provided with a code indicating that the optical disk is writable, and then judges that the optical disk is writable if at least one of the wobble, the sub-groove portion and the code is detected.

37. The optical disk according to claim 9, wherein the disk control information in the first subaltern information region and the disk control information in the second subaltern information region are formed by different recording methods.

38. The optical disk according to claim 10, wherein the disk control information in the first subaltern information region and the disk control information in the second subaltern information region are formed by different recording methods.

39. The method of preventing the illegal use of the optical disk according to claim 17, wherein the information other than the disk control information is information of whether or not the groove is provided with a wobble, and the judging of whether or not the optical disk is writable judges that the optical disk is writable if the wobble is detected.

40. The method of preventing the illegal use of the optical disk according to claim 18, wherein the information other than the disk control information is information of whether or not the groove is provided with a wobble, and the judging of whether or not the optical disk is writable judges that the optical disk is writable if the wobble is detected.

41. The method of preventing the illegal use of the optical disk according to claim 17, wherein the information other than the disk control information is information of whether or not the subaltern information region is provided with a sub-groove portion which connects a predetermined portion of the groove to an adjacent portion of the groove, and the judging of whether or not the optical disk is writable judges that the optical disk is writable if the sub-groove portion is detected.

42. The method of preventing the illegal use of the optical disk according to claim 18, wherein the information other than the disk control information is information of whether or not the subaltern information region is provided with a sub-groove portion which connects a predetermined portion of the groove to an adjacent portion of the groove, and the judging of whether or not the optical disk is writable judges that the optical disk is writable if the sub-groove portion is detected.

43. The method of preventing the illegal use of the optical disk according to claim 17, wherein the information other than the disk control information is information of whether or not another subaltern information regions which is different from the subaltern information region, is provided with a code indicating that the optical disk is writable, and the judging of whether or not the optical disk is writable judges that the optical disk is writable if the code is detected.

44. The method of preventing the illegal use of the optical disk according to claim 18, wherein the information other than the disk control information is information of whether or not another subaltern information regions which is different from the subaltern information region, is provided with a code indicating that the optical disk is writable, and the judging of whether or not the optical disk is writable judges that the optical disk is writable if the code is detected.

45. The method of preventing the illegal use of the optical disk according to claim 17, wherein the information other than the disk control information is at least one of whether or not the groove is provided with a wobble, whether or not the subaltern information region is provided with a sub-groove portion which connects a predetermined portion of the groove to an adjacent portion of the groove, and whether or not another subaltern information region, which is different from the subaltern information region, is provided with a code indicating that the optical disk is writable, and the judging of whether or not the optical disk is writable judges that the optical disk is writable if at least one of the wobble, the sub-groove and the code is detected.

46. The method of preventing the illegal use of the optical disk according to claim 18, wherein the information other than the disk control information is at least one of whether or not the groove is provided with a wobble, whether or not the subaltern information region is provided with a sub-groove portion which connects a predetermined portion of the groove to an adjacent portion of the groove, and whether or not another subaltern information regions which is different from the subaltern information region, is provided with a code indicating that the optical disk is writable, and the judging of whether or not the optical disk is writable judges that the optical disk is writable if at least one of the wobble, the sub-groove and the code is detected.

47. The method of preventing the illegal use of the optical disk according to claim 23, wherein the optical disk is a write-once optical disk.

48. The method of preventing the illegal use of the optical disk according to claim 24, wherein the optical disk is a write-once optical disk.

49. The method of preventing the illegal use of the optical disk according to claim 26, wherein the optical disk is a write-one optical disk.

* * * * *

UNITED STATES PATENT AND TRADEMARK OFFICE
CERTIFICATE OF CORRECTION

PATENT NO. : 6,992,959 B1 Page 1 of 1
DATED : January 31, 2006
INVENTOR(S) : Yoshihiro Tosaki et al.

It is certified that error appears in the above-identified patent and that said Letters Patent is hereby corrected as shown below:

<u>Column 18,</u>
Line 17, delete "or not,".

Signed and Sealed this

Thirtieth Day of May, 2006

JON W. DUDAS
*Director of the United States Patent and Trademark Office*